United States Patent Office 3,264,307
Patented August 2, 1966

3,264,307
PRODUCTION OF PYRIDINES
Daniel G. Jones, Cherry Hill, and Phillip S. Landis, Woodbury, N.J., assignors to Mobil Oil Corporation, a corporation of New York
No Drawing. Filed Apr. 9, 1963, Ser. No. 271,565
10 Claims. (Cl. 260—290)

This invention relates to the production of pyridine and substituted pyridines in the presence of an alumino-silicate having unique catalytic activity, and in particular, in the presence of an alumino-silicate catalyst having an ordered internal structure.

Both naturally occurring and synthetic alumino-silicates have been found to exhibit catalytic activity in the conversion of hydrocarbons. These alumino-silicates, known broadly as zeolites, have ordered internal structures which form internal passages, pores, or cavities of definite ranges in size. Because the dimensions of these pores serve to accept for adsorption hydrocarbon molecules of certain dimensions and reject those of larger dimension, these materials have been referred to as "molecular sieves" and are utilized so that advantage may be taken of these properties.

This invention contemplates the use of synthetic and naturally occurring alumino-silicates containing active sites within their ordered internal structure for the catalytic production of pyridine and substituted pyridines from the reaction of acetylenic compounds with ammonia.

In accordance with this invention, alkyl substituted pyridines are produced by effecting reaction of acetylene or its homologs with ammonia in the presence of an alumino-silicate catalyst having an ordered internal structure and a defined pore size of from about 6 A. to about 15 A.

It has been found that the process of this invention may be carried out under operating conditions which avoid many of the usual difficulties that occur during the production of pyridines. Also, the production of pyridines by the process of this invention can be effected at low temperatures in a continuous operation. In general, however, the operating temperatures of this process may range from 100° F. to 1000° F. and preferably extend from 120° to 750° F. to effect production of the alkyl substituted pyridines with the minimum of degradation. The alumino-silicate catalyst after a period of use may be regenerated or revitalized by burning off any accumulation of carbon products that may have formed thereon due to its high activity in the manner conventional to catalytic processes, i.e., by passing air or other oxygen containing gases at about 1000° F. through the catalyst for a period of about 120 minutes. It will be appreciated, however, that higher temperatures may be required when homologs of acetylene are used as reactants because of the coke deposits on the catalyst.

In addition, the alumino-silicate catalysts employed by this invention possess a high degree of selectivity for the production of picolines within this range of low operating temperatures. The formation of nitriles, lower molecular weight hydrocarbons, polyalkylpyridines and other heterocyclic compounds which usually occur during the production of pyridine, are either reduced to an acceptable level or substantially eliminated. Thus, it has been found that substantially no acetonitrile is produced as an intermediate in the present process and that by proper selection of catalyst little, if any, hydrocarbons are present in the reaction products. It will be understood that, when it is desired to produce certain substituted pyridines, the process may be controlled by changing the initial reactants, altering operating conditions or by employing a catalyst found to have the desired degree of selectivity.

Furthermore, in accordance with this invention, formation of pyridines may take place at pressures below atmospheric up to about 200 p.s.i.g. Generally, the pressure is determined by the phase relationships necessary to provide a preselected distribution of reaction products in the presence of the particular alumino-silicate catalyst. It is believed that use of a liquid or liquid-gaseous phase operation promotes catalyst life by reducing the formation of degradation products and by washing out the by-product polyalkylpyridines from the internal pore structure of the catalyst. It will also be appreciated that a diluent may be used to provide a liquid or liquid-gaseous phase in which the reaction takes place.

At the lower temperatures and pressures, the residence time of the reactants in contact with the alumino-silicate catalysts may vary depending on the selectivity of the catalyst used. This residence time may be better expressed in terms of hourly space velocities (the volume of reactant per volume of catalyst per hour) and may vary within the range of from about 0.1 to about 10. Preferably, the space velocity is of the order of 1 to 2. It will be appreciated that the processes of this invention provide operating conditions which will facilitate the use of less costly processing equipment and substantially reduce the operating hazards attendant to high pressure and elevated temperature operations.

In accordance with this invention, the preferred acetylenic reactants are acetylene and methyl acetylene, but other acetylenic compounds including various alkyl and aryl substituted acetylenes may also be used. Generally, these substituted acetylenes may contain up to about 8 carbon atoms per molecule and preferably the triple bond should be located adjacent to a terminal carbon atom. The following acetylenes exemplify the reactants contemplated by the invention: methylacetylene, dimethylacetylene, ethylacetylene, methylethylacetylene, phenylacetylene, vinylacetylene, heptyne-1 and the like. When certain compounds are substantially insoluble in water, e.g. phenylacetylene and vinylacetylene, organic solvents such as methanol and the like may be used to provide a medium in which the reaction takes place.

Advantageously, the ammonia required for the present process may be introduced into the reaction in an ammonia containing medium. The ammonia containing medium may consist of different forms of substantially pure ammonia or ammonia dispersed in an inert carrier. For example, liquid ammonia, ammonia dissolved in organic solvents, gaseous ammonia mixed with inert gases, or the ammonia evolved from solid compounds such as urea or ammonium salts can be effectively utilized in accordance with the invention. Because of the relatively low critical temperature of ammonia (268.7° F.), it is preferable to employ gaseous ammonia either with or without inert diluents when operating at relatively elevated temperatures and pressures. It will be appreciated that the particular ammonia containing medium is determined by the temperature and pressure conditions required for the production of a specific pyridine, the activity of the catalyst selected, the stability and solubility of the compounds to be reacted, and the desired distribution of pyridines.

It will, therefore, be appreciated that high yields of picolines together with smaller proportions of polyalkylpyridines are produced by the reaction of acetylene and ammonia in the presence of the catalysts of this invention. Furthermore, substituted pyridines of varying molecular weights can also be prepared by acetylenes containing alkyl or aryl substituents. Also mixtures of acetylenes may be employed, if so desired, to provide different distribution of products.

It will be appreciated that the mole ratio of reactants used in accordance with this invention can be varied substantially without affecting the advantages achieved by the present process. In general, at least, stoichiometric proportions of reactants should be used, i.e. a molar ratio of ammonia to acetylene of at least 1 to 3. Excessive quantities of any of the reactants may be used as desired but usually ammonia is used in excess. Preferably the molar ratio of ammonia to acetylene should be about 3 to 1. It will be understood that the ratio of reactants is dependent on the nature of the reactants as well as the desired product distribution.

It will be further appreciated that the order of introducing the reactants into the reaction zone may be controlled so as to prevent undue formation of degradation products. In general, contact of acetylene with the zeolite catalysts should be avoided unless an excess of ammonia is present. Thus, it has been found that it is preferred to saturate the catalyst material with ammonia prior to the introduction of the acetylenic compounds. In general, this saturation of the catalyst may be effected by charging an ammonia containing medium into the catalyst bed at a vapor hourly space velocity in the order of 1000 for about 30 minutes before effecting production of the desired pyridine. It will be understood that this order of introduction is especially desirable since the present process is highly exothermic and that degradation of initial reactants and products caused by hot spots within the catalyst will thereby be greatly reduced.

The alumino-silicates employed in accordance with the invention include a wide variety of alumino-silicates, both natural and synthetic, which have an ordered internal structure. The alumino-silicate can be described as a three dimensional framework of $SiO_4$ and $AlO_4$ tetrahedra in which the tetrahedra are cross-linked by the sharing of oxygen atoms whereby the ratio of the total aluminum and silicon atoms to oxygen atoms is 1:2. In their hydrated form, the alumino-silicates may be represented by the formula:

$$M_{2/n}O:Al_2O_3:wSiO_2:yH_2O$$

wherein M is a cation which balances the electrovalence of the tetrahedra, $n$ represents the valence of the cation, $w$ the moles of $SiO_2$, and $y$ the moles of $H_2O$. The cation can be any or more of a number of metal ions depending on whether the alumino-silicate is synthesized or occurs naturally. Typical cations include sodium, lithium, potassium and calcium. Although the proportions of inorganic oxides in the silicates and their spatial arrangement may vary, effecting distinct properties in the alumino-silicates, the two main characteristics of these materials is the presence in their molecular structure of at least 0.5 equivalent of an ion of positive valence per gram atom of aluminum and an ability to undergo dehydration without substantially affecting the $SiO_4$ and $AlO_4$ framework.

One of the crystalline alumino-silicates utilized by the present invention is the synthetic zeolite designated as zeolite X, and is represented in terms of mole ratios of oxides, as:

$$1.0\pm0.2M_{2/n}O:Al_2O_3:2.5\pm0.5SiO_2:YH_2O$$

wherein M is a cation having a valence of not more than 3, $n$ represents the valence of M, and Y is a value up to 8, depending on the identity of M and the degree of hydration of the crystal. The sodium form may be represented in terms of mole ratios of oxides as follows:

$$0.9Na_2O:Al_2O_3:2.5SiO_2:6.1H_2O$$

Zeolite X is commercially available in both the sodium and the calcium forms; the former being preferred for the purposes of the invention. It will be appreciated that the crystalline structure of zeolite X is different from many zeolites in that it can adsorb molecules with molecular diameters up to about 10 A.; such molecules including branched chain hydrocarbons, cyclic hydrocarbons, and some alkylated cyclic hydrocarbons.

Other alumino-silicates are also contemplated as being effective catalytic materials for this invention. Of these other alumino-silicates, a synthetic zeolite, having the same crystalline structure as zeolite X and designated as zeolite Y has been found to be particularly active. Zeolite Y differs from zeolite X in that it contains more silica and less alumina. Consequently, due to its higher silica content this zeolite has more stability to heat, steam, or hydrogen ions that zeolite X.

Zeolite Y is represented in terms of mole ratio of oxides as follows:

$$0.9\pm0.2Na_2O:Al_2O_3:WSiO_2:XH_2O$$

wherein "W" is a value greater than 3 up to about 5 and "$x$" may be a value up to about 9.

The selectivity of zeolite Y for larger molecules is appreciably the same as zeolite X because its pore size extends from about 10 A. to about 13 A.

Another alumino-silicate material found to be active in the present process is a naturally occurring zeolite known as mordenite. This zeolite is an ordered crystalline structure having a ratio of silicon atoms to aluminum atoms of about 5 to 1. In its natural state it usually appears as the sodium salt which is represented by the following formula:

$$Na_8(AlO_2)_8(SiO_2)_{40}24H_2O$$

Mordenite differs from other known zeolites in that ordered crystalline structure is made up of chains of 5-membered rings of tetrahedra and its adsorbability suggests a parallel system of channels having free diameters on the order of 4 A. to 6.6 A., interconnected by smaller channels, parallel to another axis, on the order of 2.8 A. free diameter. As a result of this different crystalline framework, mordenite can adsorb simple cyclic hydrocarbons, but cannot accept the large molecules which will be adsorbed by zeolite X and zeolite Y. As a consequence of this smaller pore size it has been found that mordenite will be more rapidly deactivated than either zeolite X or zeolite Y at the operating conditions of the present process.

It will be appreciated that several other alumino-silicates may be utilized as catalysts for the production of pyridines in accordance with the process of this invention. The basic criteria for such a catalyst is that it must have an ordered internal structure, the pore sizes of which are preferably of sufficient diameters to allow entry of the preselected reactants and the formation of the desired pyridines. In addition, the alumino-silicate advantageously, should have an ordered internal structure capable of chemisorbing or ionically bonding additional metal or hydrogen ions within its defined pore structure, so that its catalytic activity may be modified for the production of a particular pyridine.

The preferred alumino-silicate catalyst contemplated for production of pyridines is prepared from either the alkali metal or alkaline earth metal forms of the alumino-silicates described herein by the incorporation of additional metals within the ordered internal structure of the catalyst. This incorporation is effected by conventional methods, involving the partial or complete replacement of the alkali metal or alkaline earth metal by contact with a fluid medium containing cations of metals such as copper, vanadium, iron, cobalt, nickel, manganese, chromium, molybdenum, tungsten, uranium, tin, silver, the rare earth metals, and the like.

Advantageously, the rare earth cations can be provided from the salt of a single metal or preferable mixture of metals such as a rare earth chloride or didymium chlorides. Such mixtures are usually introduced as a rare earth chloride solution which, as used herein, has reference to a mixture of rare earth chlorides consisting essentially of the chlorides of lanthanum, cerium, praseodymium, and neodymium, with minor amounts of samarium, gadolinium, and yttrium. This solution is commercially available and contains the chlorides of a rare earth mixture having the relative composition cerium (as $CeO_2$) 48 percent by weight, lanthanum (as $La_2O_3$) 24 percent by weight, praseodymium (as $Pr_6O_{11}$) 5 percent by weight, neodymium (as $Nd_2O_3$) 17 percent by weight, samarium (as $Sm_2O_3$) 3 percent by weight, gadolinium (as $Gd_2O_3$) 2 percent by weight, yttrium (as $Y_2O_3$) 0.2 percent by weight, and other rare earth oxides 0.8 percent by weight. Didymium chloride is also a mixture of rare earth chlorides, but having a low cerium content. It consists of the following rare earths determined as oxides; lanthanum, 45–46 percent by weight; cerium 1–2 percent by weight; praseodymium, 9–10 percent by weight; neodymium, 32–33 percent by weight; samarium, 5–6 percent by weight; gadolinium 3–4 percent by weight; yttrium, 0.4 percent by weight; other rare earths 1–2 percent by weight. It is to be understood that other mixtures of rare earths are equally applicable in the instant invention.

It will be appreciated that the above enumerated metals are merely representative of the metals which may be incorporated within the ordered internal structure of the alumino-silicate catalysts and that it is contemplated by this invention to include those metals possessing catalytic activity found in Groups I, II, III, IV, V, VI, VII, and VIII of the Periodic Table of Elements. It will also be understood that, in general, those metals having a valence greater than one are preferred.

Any medium which will ionize the cations to be exchanged without affecting the ordered internal structure of the zeolite may be employed. After such treatment the resulting exchanged product is water washed, dried, and dehydrated. The dehydration thereby producing the characteristic system of open pores, passages, or cavities of alumino-silicates having an ordered internal structure.

The above treatment of the alumino-silicate provides a metal exchanged crystalline-like alumino-silicate catalyst in which the molecular structure of the alumino-silicate has been changed by having a portion of its active sites cations exchanged with a preferred metal or metals from the group of the Periodic Table of Elements as set forth above. It has been found that these alumino-silicate catalysts used in the process of this invention are very effective in the production of pyridines and alkyl pyridines when at least a portion and preferably substantially complete replacement of the exchangeable cations in the alumino-silicate is accomplished with one or more of the metals as heretofore defined.

Of the metals listed above, particularly effective are zinc, silver, and cobalt, for when these metals are cation exchanged with a zeolite, there is produced a highly active catalyst for effecting the production of pyridine and substituted pyridine. It has also been found that transition heavy metals of Groups IB to VIIB and Group VIII, and more particularly those metals which are not easily reducible by hydrogen produce effective catalyst when these metals are base exchanged with the ionizable metal of a zeolite. In the production of picolines from acetylene and ammonia, a zinc exchanged zeolite X catalyst having a pore size of from about 10 A. to about 13 A. has been found extremely effective. Also, the zinc exchanged zeolite exhibits high catalytic activity in the reaction of ammonia and substituted acetylene. It has also been found that a silver exchanged zeolite X having a pore size from about 10 A. to 13 A. is an excellent catalyst for the production of alkyl substituted pyridines from acetylene and that low acidic alumino-silicate catalysts, that is those having some hydrogen sites, are most effective in the production of pyridines and substituted pyridines by the process of this invention.

The production of pyridines from acetylenes and ammonia may also be effected in the presence of the sodium form of zeolite X having a pore size of about 10 A. to about 13 A. It has been found, however, that more hydrocarbons are present in the reaction products than are present when the cation exchanged catalyst is used. Also, other alumino-silicate catalysts, such as zeolite Y and mordenite, may be exchanged or loaded with metals from the groups heretofore set forth to serve as catalysts for the production of the pyridines contemplated by this invention.

It will also be appreciated that the unique activity achieved by the catalytic material of the present invention necessarily may be altered to suit the formation of a particular pyridine compound. The alumino-silicate catalyst may be treated to increase its activity for a specific reaction. As heretofore described, the catalyst may include certain active cations such as hydrogen, iron, silver, cobalt, or the like, or metallic additives in elemental form which enhance such catalytic ability. Thus, it has been found that the degree to which the alkali metals or alkaline earth metal has been replaced by another active metal or hydrogen ion may serve as a measure of the increased activity.

The process of this invention may be more readily understood from the data set forth in the following table of runs in which acetylenic compounds were reacted with ammonia in the presence of base exchanged alumino-silicate catalysts to product pyridines. The runs were conducted in a tubular glass reactor containing about 5 grams of alumino-silicate catalyst having a particle size of from 8 to 14 mesh and a pore size of about 13 A. The reactants were metered in gaseous form from cylinders and introduced into the reactor. Each run was conducted under conditions so as to provide an ammonia liquid hourly space velocity of about 0.5. The mixture of products formed were isolated and identified to determine the formation of pyridines.

*Table of runs*

| Catalyst | Reactants | Ratio, $NH_3$/acetylenic compound | Temp., °F. | Products |
|---|---|---|---|---|
| Silver 13X zeolite. | Acetylene and ammonia. | 3:1 | 212 | Mostly 2-methylpyridine. |
| Cobalt 13X zeolite. | ---do------- | 3:1 | 572 | 1:1 mixture of hydrocarbons and methyl pyridines. |
| Silver 13X zeolite. | Methylacetylene and ammonia. | 1:1 | 572 | Mostly 3-methylpyridine. |
| Zinc 13X zeolite. | ---do------- | 2:1 | 482 | 2-methylpyridine, 4-methylpyridine and polymethylpyridines with trace of hydrocarbons. |

It is apparent from the above data that a base-exchanged alumino-silicate catalyst of this invention will product alkylpyridines when an acetylenic compound and ammonia are reacted in the presence of the catalyst. Zinc, silver, and cobalt exchanged 13X zeolite catalysts produce high yields of pyridine in such a reaction. It is apparent that many metal exchanged zeolites may be used. Silver exchanged zeolites are particularly effective catalysts.

It will be appreciated that many pyridine and substituted pyridine compounds may be made by the process of this invention by selecting the particular acetylenic or substituted acetylenic materials to be reacted with ammonia in the presence of one or more of the base exchanged alumino-silicate catalysts, as heretofore set forth. The type of pyridine or substituted pyridine compounds produced may, in many cases, be varied by the regulating of the temperature, pressure, space velocity of the reactants, unit contact time, type of base exchange catalyst, and the degree to which the catalyst has been base exchanged.

Also, the process may be conducted in a batch-wise reactor or as a continuous reaction with the customary regeneration cycle for reviving the activity of the catalyst after it has been spent due to coking or fouling of the surface because of the tremendous activity present in the catalyst for this type of reaction.

It will be further appreciated that the runs set forth above are merely illustrative of the different alumino-silicate catalysts that may be employed to produce alkylpyridines, and that other base exchanged alumino-silicate catalysts may be used to carry out the processes of this invention, also that various modifications and alterations may be may in the process of this invention without departing from its spirit and scope and that the invention is limited only by the specification and appended claims.

What is claimed is:

1. A process for producing pyridine compounds selected from the group consisting of pyridine and alkyl and aryl derivatives thereof, which comprises effecting reaction of ammonia and an acetylenic compound selected from the group consisting of acetylene and its homologs containing up to 8 carbon atoms per molecule at a temperature from about 120° to about 750° F. in the presence of a catalyst consisting essentially of an alumino-silicate having an ordered internal structure and a pore size of from about 6 A. to about 15 A. in diameter and recovering a product containing at least one of the said pyridine compounds.

2. The process of claim 1 in which the catalyst contains a transition metal introduced by base exchange.

3. The process of claim 1 in which the catalyst contains a metal introduced by base exchange selected from the group consisting of silver, zinc, and cobalt.

4. The process of claim 1 in which the acetylenic compound is acetylene and the product contains methyl pyridines.

5. The process of claim 1 in which the acetylenic compound is methylacetylene, the catalyst is a silver exchanged crystalline alumino-silicate and the product contains 3-methyl pyridine substantially free from nitriles and hydrocarbons.

6. The process of claim 1 in which the reaction is conducted in the presence of inert diluents.

7. A process for producing pyridine compounds selected from the group consisting of pyridine, and alkyl and aryl substituted derivatives thereof, which comprises effecting reaction of ammonia and an acetylenic compound selected from a group consisting of acetylene and its homologs containing up to about 8 carbon atoms per molecule at a temperature between about 120° to 750° F. in the presence of a catalyst consisting essentially of an alumino-silicate having an ordered internal structure and a pore size from 6 A. to about 15 A.

8. The process of claim 7 in which said catalyst is a metal exchanged alumino-silicate.

9. The process of claim 7 in which said catalyst is a metal exchanged alumino-silicate selected from the group consisting of zeolite X and zeolite Y.

10. A process for producing pyridine compounds selected from a group consisting of pyridine, and alkyl and aryl substituted derivatives thereof which comprises effecting reaction of an acetylenic compound selected from the group consisting of acetylene and its homologs containing up to 8 carbon atoms per molecule and ammonia at a temperature from about 120° to about 750° F. in the presence of a catalyst consisting essentially of an alumino-silicate containing metals micro-precipitated within the pore structure of the alumino-silicate, selected from the class consisting of Groups I, II, III, IV, V, VI, VII, and VIII of the Periodic Table, said alumino-silicate having a defined pore size of from 6 A. to about 15 A. within an ordered internal structure.

References Cited by the Examiner

UNITED STATES PATENTS

| | | | |
|---|---|---|---|
| 1,421,743 | 7/1922 | Stuer et al. | 260—290 X |
| 2,744,904 | 5/1956 | Cislak et al. | 260—290 |
| 2,807,618 | 9/1957 | Cislak et al. | 260—290 |
| 2,854,457 | 9/1958 | Cislak et al. | 260—290 |
| 2,934,537 | 4/1960 | Cislak et al. | 260—290 |
| 2,995,558 | 8/1961 | Mahan et al. | 260—290 |

FOREIGN PATENTS 332,623  7/1930  Great Britain.

WALTER A. MODANCE, *Primary Examiner.*
NICHOLAS S. RIZZO, *Examiner.*
M. W. WESTERN, J. M. FORD, *Assistant Examiners.*